United States Patent [19]
Chang et al.

[11] Patent Number: 6,105,012
[45] Date of Patent: *Aug. 15, 2000

[54] SECURITY SYSTEM AND METHOD FOR FINANCIAL INSTITUTION SERVER AND CLIENT WEB BROWSER

[75] Inventors: Sheueling Chang, Cupertino; Stuart Marks, Mountain View, both of Calif.

[73] Assignee: Sun Microsystems, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/841,430

[22] Filed: Apr. 22, 1997

[51] Int. Cl.[7] .................................................... G06F 17/60
[52] U.S. Cl. ......................... 705/64; 713/151; 713/160; 380/277; 380/28
[58] Field of Search ............................... 395/200; 380/23, 380/24, 25, 21, 4, 49; 705/1, 4; 707/101, 109, 201, 1, 3, 10, 5, 501, 523, 202; 709/206, 203

[56] References Cited

U.S. PATENT DOCUMENTS

| | | | |
|---|---|---|---|
| 5,319,710 | 6/1994 | Atalla et al. | 380/23 |
| 5,509,071 | 4/1996 | Petrie, Jr. et al. | 380/4 |
| 5,671,279 | 9/1997 | Elgamal | 380/23 |
| 5,751,813 | 5/1998 | Dorenbos | 380/49 |
| 5,809,144 | 9/1998 | Sirbu et al. | 380/25 |
| 5,848,161 | 12/1998 | Luneau et al. | 380/49 |
| 5,862,325 | 1/1999 | Reed et al. | 395/200.31 |
| 5,890,171 | 3/1999 | Blumer et al. | 707/501 |
| 5,897,622 | 4/1999 | Blinn et al. | 705/26 |

OTHER PUBLICATIONS

SKIP IP–Level Encryption; SKIP –Simple Key management for Internet Protocols IP–Level Cryptography; http://www.skip–vpn.org, 1998.

Simple Key–Management for Internet Protocols (SKIP); Ashar Aziz et al.; http://www.skip–vpn.org/spec/SKIP.htm, Apr. 24, 1997.

SKIP Applicability Notes; SKIP –Security the Internet; Caronni et al.; http://www.skip–vpn.org/wet–ice.htm, 1996.

SKIP Information; Simple key–Management for Internet Protocols (SKIP); Ashar Aziz; Martin Patterson; http://www.skip–vpn.org/inet–95.htm, Aug. 5, 1996.

The Windows NT Web Server Book, Tools & Techiques For Bulding An Internet/Intranet Site, Larry Budnick, 1996.

World Wide Web & HTML, Douglas C. McArthur, 1994.

*Primary Examiner*—James P. Trammell
*Assistant Examiner*—Yehdega Retta
*Attorney, Agent, or Firm*—Pennie & Edmonds LLP

[57] ABSTRACT

The financial transaction processing system includes at least one financial server connected through a public network to a number of users associated with client computers. Each user accesses the financial server through a web browser. The web browser is provided with the capabilities to generate encryption keys, to encrypt and decrypt HTML forms, and to digitally sign and timestamp HTML forms. The financial server transfers web pages including HTML forms representing financial transactions. The HTML forms contain extensions that specify the format of an incoming format and the format of a returned form. An HTML form can be transmitted in an encrypted format, in a format including a user's digital signature and timestamp, and in an encrypted format that contains the user's digital signature and timestamp. The financial server tracks each processed transaction through an audit trail including the user's account, the user's digital signature, the timestamp of the transaction, and the text of the transaction.

31 Claims, 13 Drawing Sheets

268

```
<FORM ...., request = "register",
        key = "server's public key">

...
</FORM>
```

```
<FORM ...., outformat = {"encrypt" | "sign" | "ensign "},
         informat = "encrypt",
         key = "server's public key">

...
</FORM>
```

BROWSER WELCOME PAGE

Establish Encryption key pair

Enter password: [        ]

Encryption Keys:

[        ] private key
[        ] public key

USER REGISTRATION FORM

Name: [        ]

Address: [        ]

SECURITY SYSTEM AND METHOD FOR FINANCIAL INSTITUTION SERVER AND CLIENT WEB BROWSER

This invention relates to electronic communication systems and in particular to a method and apparatus for securely transmitting transactions from an application program.

BACKGROUND OF THE INVENTION

Today, there is a great demand to support online financial transactions in a client/server computing environment. The key to the success of such systems are security features to ensure that an authorized party securely transmits a communication to an authorized recipient. At a minimum, five security features are needed: privacy, data integrity, access control, user nonrepudiation, and a server side audit trail.

Current security technology for clients calling financial servers include (A) systems using passwords and the like to indicate a client's identity, (B) systems using session keys to encrypt the communications between a client and server so that outsiders cannot eavesdrop, and (C) systems using a digital signature and certification process.

Session key encryption provides privacy protection, and password mechanisms provide basic access control capabilities. The prior art does not provide absolute assurance that the party claiming to be a client is in fact the identified client (or even that the party is using the client's workstation), and also does not protect the financial institution from claims by clients that they did not send a particular message or request. The audit trail of the prior art systems will only show that the party that sent the message or request used the client's password to log in, which is often not conclusive proof. Thus, the financial institution is at risk of repudiation of transactions by clients.

Furthermore, the systems (e.g., Quicken, Netscape and Schwab's Smart Money using RSA encryption software) for encrypting the communications do so at the TCP/IP protocol layer of each system's software. This type of security technology limits the type of security features that can be provided. For instance, a security feature at the TCP/IP protocol level, such as SSL, typically provides only privacy by encrypting all data transmitted, but it cannot authenticate the client.

Systems utilizing client digital signatures are typically used with digital certificates. Digital certificates require a public key to be signed by a trusted third party. They are typically used to authenticate that a particular public key is really that of a particular user. However, financial institutions are reluctant to utilize digital certificates since they are wary of the potential liability associated with their fraudulent misuse.

SUMMARY OF THE INVENTION

The present invention pertains to a system and method for providing a secure communication mechanism between a financial server and a user associated with a web browser. The communication mechanism is used to ensure that financial transactions are securely transmitted between the user and server across a public network. The system includes a group of users associated with client computers that are interconnected, by a computer network such as the Internet, to at least one financial server associated with a server computer.

The financial server has a web server that manages the interactions between the users, through their web browsers, and the financial server. The web server has a repository of web pages associated with various financial services provided by the financial server. The web pages contain HTML documents and forms representing financial transactions that are exchanged between the user and the server. A user utilizes a web browser to access the HTML documents and to return data from HTML forms to the server. The server then processes the transactions and updates an audit trail that tracks each transaction.

Due to the highly confidential nature of the transactions, the system and method of the present invention incorporates several security features into the web browser and web server. The following five security features are provided: privacy, in the form of session key encryption; data integrity, through the use of data encryption; access control, via a password mechanism; user nonrepudiation, by means of digital signatures and timestamps; and a server side audit trail.

The web browser is provided with the capability to receive encrypted forms and to transmit messages containing timestamped, digitally signed, and encrypted form data. The web browser has the ability to provide each user with a pair of encryption keys, preferably a private and public key pair. The web browser's initialization procedure generates these keys during installation. The keys are stored in an encrypted format and are only accessible from within the browser. The private key is used to digitally "sign" a transaction message when so requested.

The web browser is also provided with the capability to generate random session keys, to decrypt HTML forms, and to encrypt and digitally sign and timestamp HTML form data. In addition, the web browser can interpret HTML extensions to the FORM tag that specify that an HTML form is encrypted as well as request the return transmission of HTML form data in one of three formats: (1) encrypted; (2) digitally signed with a timestamp; or (3) encrypted and digitally signed with a timestamp.

To return the encrypted form data, the web browser generates a random session key that is used to encrypt the message containing the form data. The session key is affixed to the return message and encrypted with the server's public key. A header record is included at the top of the message and includes a flag indicating that the form data is encrypted.

If a form requires the user's digital signature, the web browser uses the user's private key to "sign" the returned form data and to affix a digital timestamp. The web server authenticates the user's digital signature with the user's public key. For forms requiring a digital signature and encryption, the web browser signs the form data with the user's private key and includes a digital timestamp as well. The web browser generates a random session key that is used to encrypt the form data. The random session key is affixed to the return message and encrypted with the server's public key.

The web server reads the header record associated with a received message in order to determine the format of the message. A flag associated with the header record indicates the particular format. The web server processes the message accordingly and updates an audit trail with the form data, the user's digital signature, and timestamp, if applicable.

In order to verify a user's digital signature, a user registration process is performed initially by the web server at the time a user's account is established. The registration process is facilitated by a user registration HTML form that elicits financial data pertaining to a potential user. A user appends its public key to the registration form data which is returned to the web server. The web server stores the users public key in a database and it is used thereafter to verify the user's digital signature which may be embedded in subsequent transactions.

BRIEF DESCRIPTION OF THE DRAWINGS

Additional objects and features of the invention will be more readily apparent from the following Detailed Description and appended claims when taken in conjunction with the drawings in which:

FIG. 7 is a schematic representation of an exemplary HTML FORM tag used in connection with a user registration form.

FIG. 8 is a schematic representation of an exemplary HTML FORM tag including additional fields that indicate the format of incoming forms and return messages.

FIG. 11 is a schematic representation of an exemplary web page used by the web browser to initiate the generation of a users encryption keys.

FIG. 14 is a schematic representation of an exemplary user registration HTML form.

DESCRIPTION OF THE PREFERRED EMBODIMENTS

Overview

Figure 1:
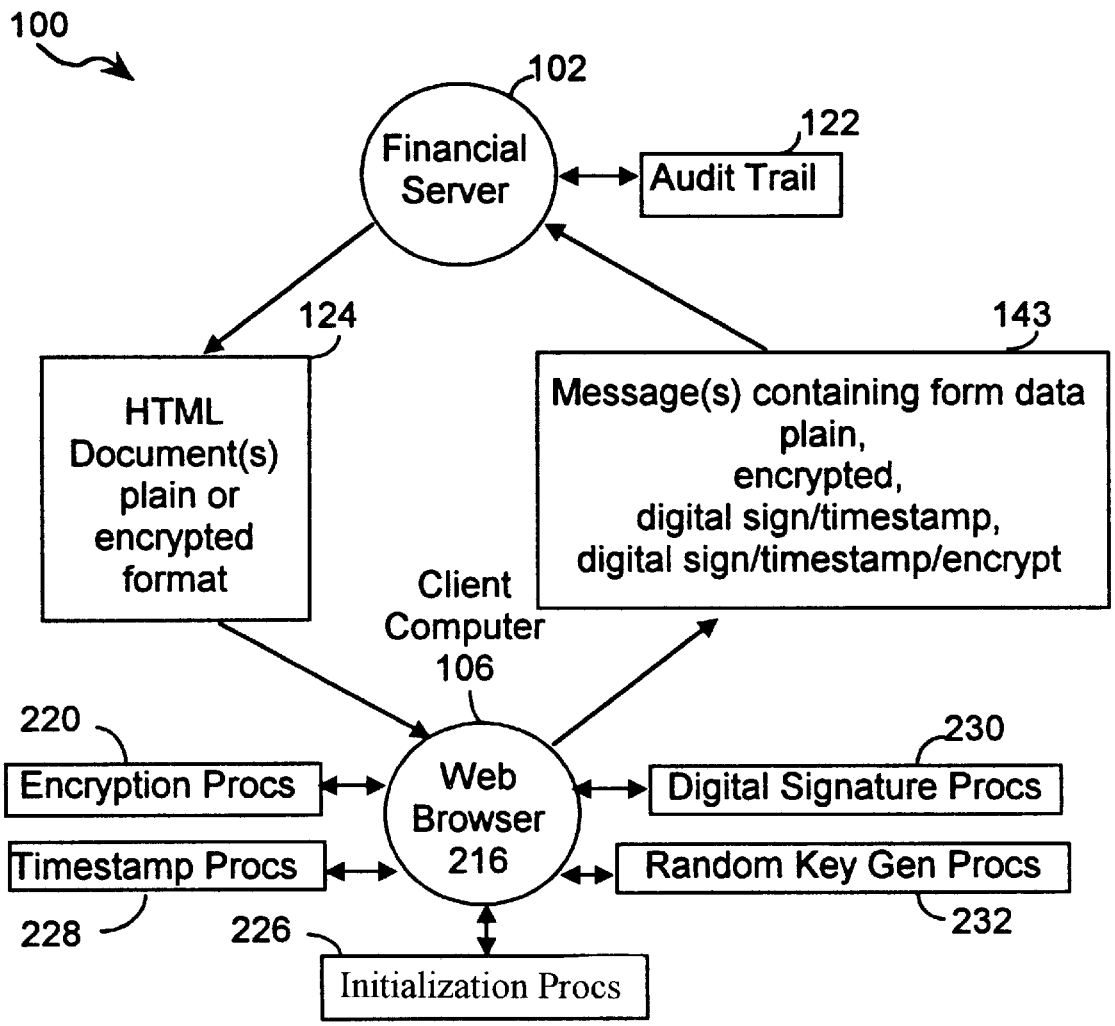
FIG. 1 shows a financial transaction processing system according to an embodiment of the present invention.

Referring to FIG. 1, the present invention pertains to a distributed financial transaction processing system 100 and method including at least one financial server associated with a server computer 102 in communication with a number of users associated with client computers 106.

The financial server 102 provides various financial services which are offered by a financial institution such as a bank, insurance company, brokerage firm, credit union, and the like. The financial services can include an online trading service, means for obtaining investment product information or financial news, means for monitoring a user's portfolio holding, and the like.

Users connected to the financial server 102 can request any one of the financial services. One or more web pages are associated with a service and are downloaded to the client computer 106 at the user's request. The web pages can include HTML documents 124 containing HTML forms used to elicit information from the user 106 that is transmitted to the server 102 or to provide information to the user 106 from the server 102. In addition, the financial server 102 contains an audit trail 122 that tracks each transaction.

In certain cases, the HTML forms 124a can be transmitted to the web browser 216 in an encrypted format or without any special formatting. The web browser returns messages 143 containing form data to the financial server 102 in an encrypted format, a format containing the user's digital signature and timestamp, an encrypted format containing the user's digital signature and timestamp, or without any special formatting. The web browser 216 has the capability to recognize special extensions to the HTML FORM tag that indicate the format of the incoming document and specify the format of the data to be returned. An alternate embodiment might specify extensions to other HTML tags.

In addition, the web browser 216 is equipped with encryption procedures 220, timestamp procedures 228, digital signature procedures 230, and random key generation procedures 232. The random key generation procedures 232 are used to generate session keys that are used in conjunction with the encryption procedures 220 to encrypt a return message. The digital signature 230 and timestamp 228 procedures enable the web browser to digitally sign and timestamp a return message 143. In addition, the initialization procedures 226 enable the web browser 216 to generate encryption keys 218 that are used to represent and verify a user's digital signature.

System Architecture

Figure 2:
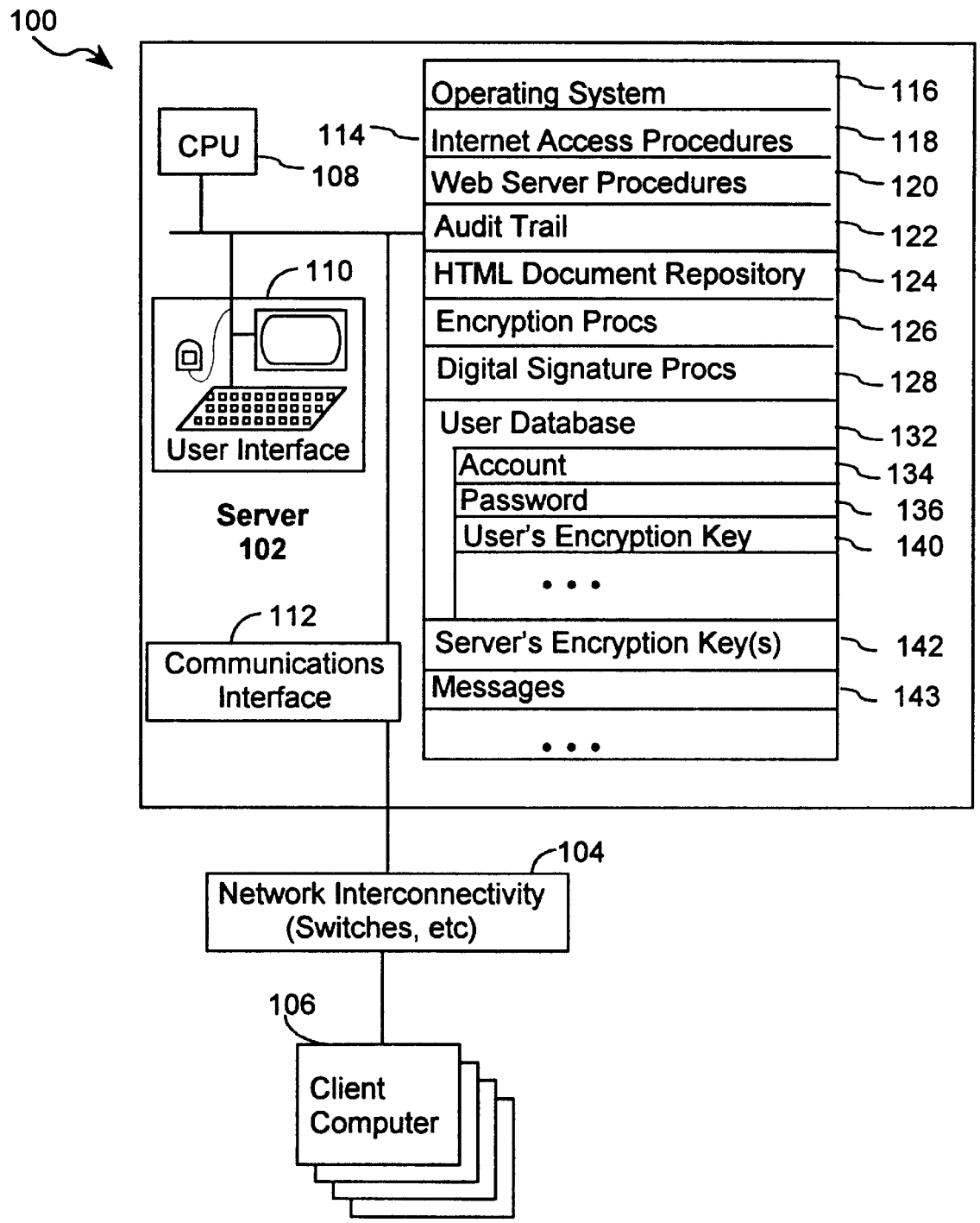
FIG. 2 shows a server computer system according to an embodiment of the present invention.

Referring to FIG. 2, there is shown a distributed computer system 100 according to an embodiment of the present invention. The system 100 includes one or more server computers 102 and one or more client computers 106 that are in communication with each other through a communication link 104. Preferably, the communication link 104 is a public network such as the Internet.

A server computer 102 includes a central processing unit (CPU) 108, a user interface 110, a communications interface 112, and a primary memory 114. The communications interface 112 is used to communicate with other user workstations as well as other system resources not relevant here.

The primary memory 114 of the server computer 102 may be implemented as RAM (random access memory) or a combination of RAM and non-volatile memory such as magnetic disk storage. The primary memory 114 of the server computer 102 can contain the following:

an operating system 116;
Internet access procedures 118;
Web server procedures 120;
an audit trail 122 tracking each financial transaction processed by the financial server 102;
an HTML document repository 124;
an encryption procedure 126 for encrypting and decrypting data;
a digital signature procedure 128 for signing and verifying a digital signature;
a user database 132 storing information associated with each user;
one or more encryption keys 142 for use by the server;
messages 143;
as well as other data structures and procedures.

The user database 132 can store the following:
an account identifier 134;
a password 136;
one or more of the user's encryption keys 140 that are used to authenticate a user's digital signature; and
as well as other data structures and procedures.

Figure 3:
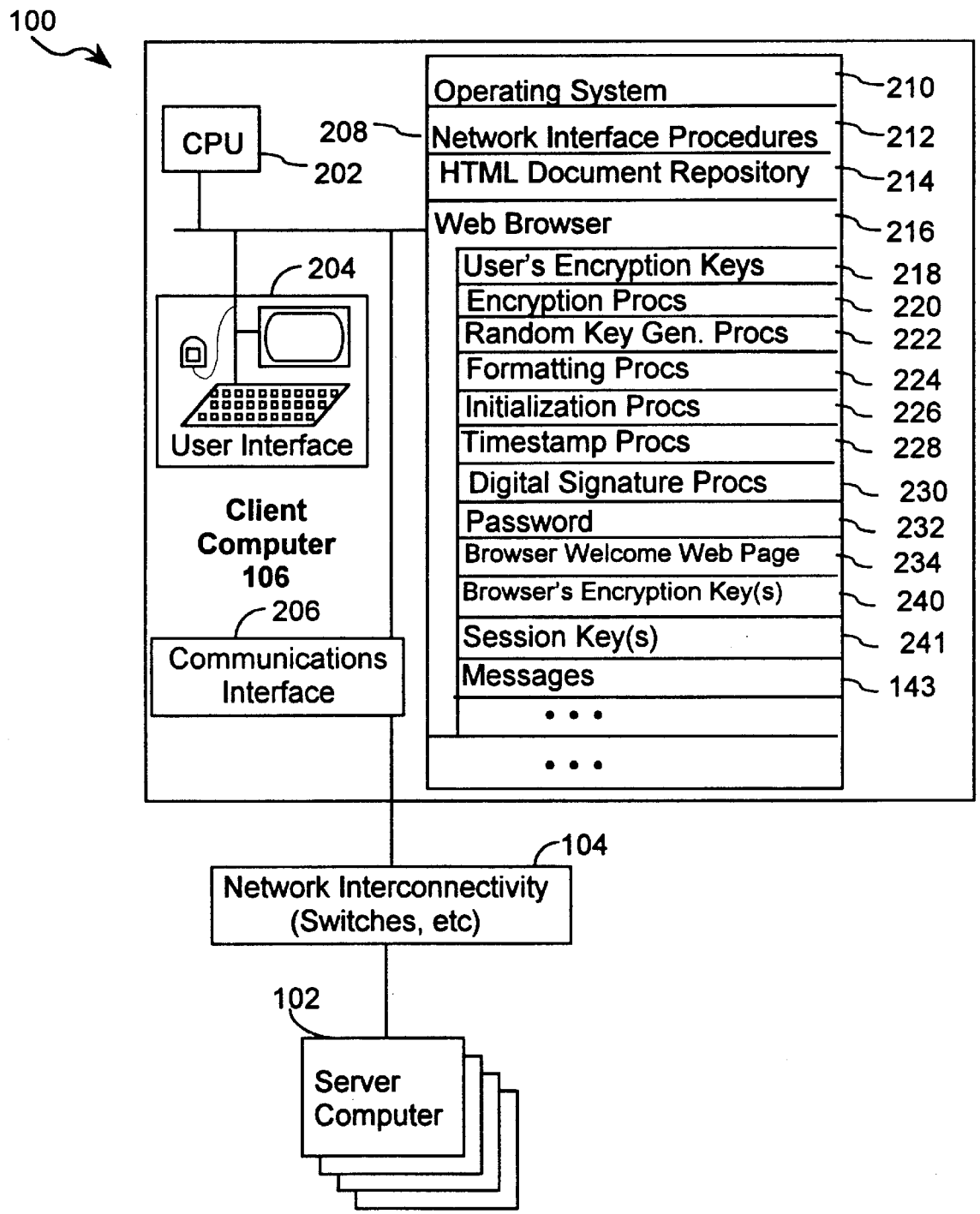
FIG. 3 shows a client computer system according to an embodiment of the present invention.

Referring to FIG. 3, a client computer 106 includes a central processing unit (CPU) 202, a user interface 204, a communications interface 206, and a primary memory 208. The communications interface 206 is used to communicate with other user workstations as well as other system resources not relevant here.

The primary memory 208 of the client computer 106 may be implemented as RAM (random access memory) or a combination of RAM and non-volatile memory such as magnetic disk storage. The primary memory 208 of the server computer 102 can contain the following:
an operating system 210;
network access procedures 212;
an HTML document repository 214;
a web browser 216;
messages 143;
as well as other data structures and procedures.

The web browser 216 can contain the following:
one or more user encryption keys 218 associated with the user's digital signature;
an encryption procedure 220 for encrypting and decrypting data;
a random key generation procedure 222 for randomly generating session keys;
a formatting procedure 224 for configuring a return message in a requested manner;
an initialization procedure 226 that establishes the user's encryption keys 218;
timestamp procedures 228 that generate a timestamp representing a time and date;
digital signature procedures 230 that are used to sign a form and verify a user's digital signature;
the user's password 232;
a browser welcome web page 234;
a browser's encryption key 240 that is used to encrypt the users encryption keys 218;
one or more session keys 241 for use in encrypting return messages to the server;
as well as other data structures and procedures.

File Formats

Figure 4:
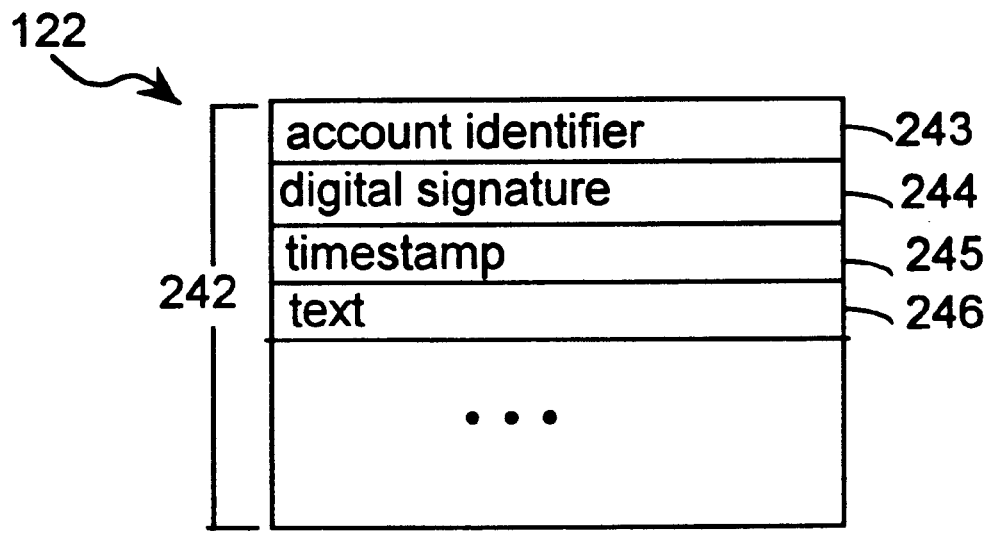
FIG. 4 shows a format of an audit trail residing in the server computer.

The present invention utilizes an audit trail and a form file having prescribed formats. FIG. 4 represents a format of the server's audit trail 122. The audit trail 122 is used to track each transaction that is processed by the financial server 102. The audit trail 122 serves a variety of purposes. One such purpose is to verify client messages and requests. Each communication initiated by a client and received by the financial server 102 is recorded in the audit trail 122.

Each entry 242 in the audit trail 122 can contain an account identifier 243 associated with a particular user, the digital signature 244 associated with a particular user, a timestamp 245 representing the date and time at which the user digitally signed the transaction, and the text 246 associated with the transaction. In some cases, a transaction form will contain the users digital signature and timestamp. In these cases, the users digital signature and timestamp can be used to refute potential repudiation claims by the user. The existence of the user's digital signature and timestamp signifies that a particular user executed the transaction and at a certain date and time. The ability to refute repudiation claims is sometimes called "nonrepudiation."

The benefit of this invention is that it helps reduce fraud and errors in three ways. First, it prevents unauthorized users from forging transactions. Second, it makes it difficult for a user to repudiate a transaction that has actually been made. Lastly, audit trail entries are potentially useful as judicial evidence. Furthermore, the security features of this invention benefit companies such as Charles Schwab that offer securities and financial transaction services over the Internet.

It should be noted that, in the description above, the timestamp stored in the audit trail was actually generated by the client. It is possible for this timestamp to be in error, either because of a configuration problem (e.g., the users PC had its clock set wrong) or because of fraudulent intent on the part of the user. The timestamp stored in the audit trail is thus merely the client's assertion as to the time at which the transaction was made. The server has several options available that can increase the trustworthiness of the audit trail entries. The server can store a timestamp of its own along with the client-supplied timestamp in the audit trail. Or, the server can reject transactions whose timestamps differ from the current actual time by a significant amount. Another possibility is for the server to generate a timestamp and send it to the client in another extension to the HTML FORM tag. The client would include the server-generated timestamp as part of the return message. Still another possibility would be for the server to generate a timestamp and to digitally sign it before sending it to the client. All of these possible embodiments increase the trustworthiness of the timestamps in the audit trail, thus serving to increase the usefulness of the audit trail in reducing fraud and errors.

This invention employs digital signatures and encryption without using authentication certificates. Using digital signatures and encryption without authentication certificates offers several advantages over the prior art use of authentication certificates. Setting up the authentication certificate infrastructure is very time-consuming and costly. The process of issuing certificates is very cumbersome. Authentication certificates are useful in cases where more than two parties are involved in a transaction. The techniques employed in this invention are effective for two-party transactions, such as between a financial institution and one of its customers. Furthermore, these techniques avoid the expense of setting up the authentication certificate infrastructure as well as avoiding the overhead of certificate issuance and maintenance.

Figure 5:
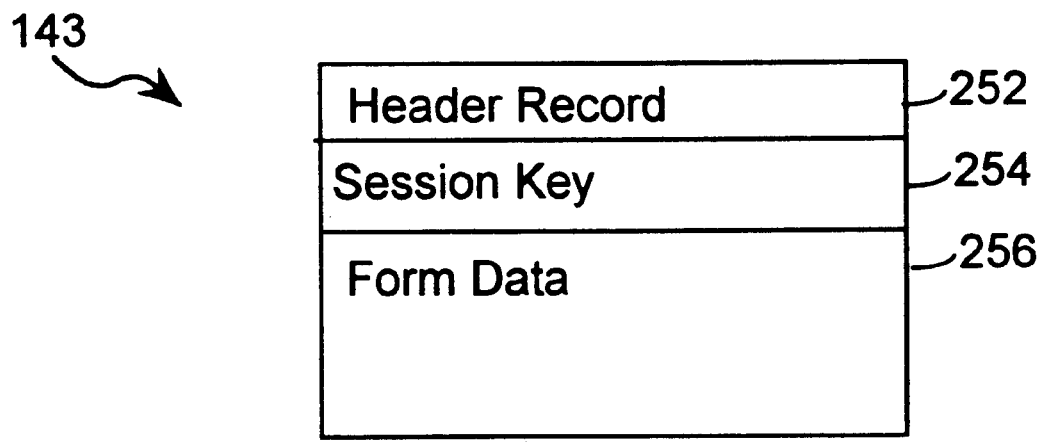
FIG. 5 shows a return message layout in accordance with the present invention.
Figure 6:
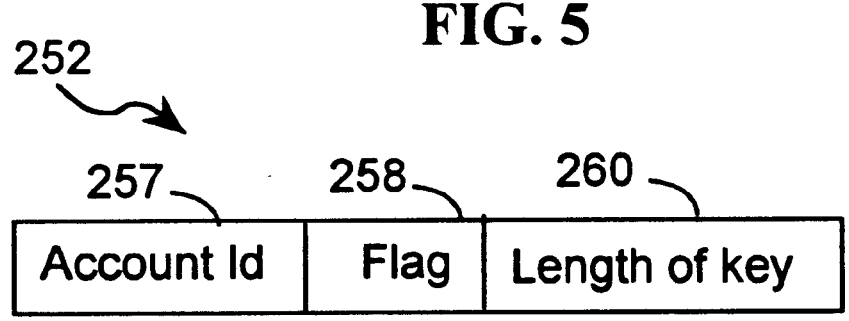
FIG. 6 shows the record layout of the header record of the return message of FIG. 5.

FIGS. 5 and 6 Illustrate the return message layout that the web browser utilizes in returning a message 143 back to the server 102. The return message 143 contains a header record 252 containing an account identification (ID) field 257, a flag field 258 and a key length field 260. The flag field can take on the following values: "E", representing an encrypted format; "S", indicating that the form data 256 contains a digital signature and a timestamp; "A", representing an encrypted format containing a digital signature and timestamp; and "N", representing no special formatting. The key length field 260 indicates the length of a random session key when enclosed.

The second record of the return message 143 can be the random session key 254. This key 254 is enclosed in the return message whenever the form data 256 is encrypted. In cases where the data is not transmitted in an encrypted format, no session key is included in the form file. The third portion of the return message 143 contains the form data 256. The form data 256 is formatted as indicated in the flag field 258 of the header record 252.

It should be noted that the present invention is not limited to the file formats and contents as previously described. Other formats can be used that can include different contents.

HTML Extensions

The present invention employs extensions to the HTML FORM tag. One set of extensions pertains to processing the user registration HTML form 264. This form is used to transmit the server's public key to the user and for the user to transmit to the server the users public key. A second set of extensions is used to indicate the format of received and transmitted HTML forms and return messages.

FIG. 7 shows the extensions to the HTML FORM tag associated with a user registration form 268. The first is the request field (e.g., request="register") which is used to indicate the type of form that follows. A value of register indicates that the form is a registration form. The second new field is the key field (e.g., key="server's public key") which is used to indicate the server's public key. The server's public key is used in the encryption process associated with the returned user registration message.

FIG. 8 illustrates the extensions to the HTML FORM tag that are used to indicate the format of incoming (i.e., received by the web browser) forms or outgoing (i.e., transmitted by the web browser to the server) messages. The HTML FORM tag can include an outformat and an informat field. The outformat field specifies the format of the return message and the informat field specifies the format of the incoming or received form. The values for the informat field can include "encrypt" indicating that the incoming form associated with the FORM tag is encrypted. The values for the outformat field can include "encrypt", "sign", or "ensign." The "encrypt" value signifies that the form data is to be returned in an encrypted format. The "sign" value signifies that the returned form data is to include the user's digital signature and timestamp. The "ensign" value signifies that the returned form data is to be encrypted and include the user's digital signature and timestamp.

In addition, the key field can be used to transmit a server's encryption key along with the informat and outformat field. The server's public key is transmitted to the web browser in order for the public key to be used to encrypt the session key. In one embodiment, the server's public key can be included in each HTML form that requires encryption. In another embodiment, the server's public key can be included in the first HTML form transmitted to the user. It is retained by the web browser for the duration of the session. This obviates the need to retransmit the server's public key with each subsequent transmission.

The HTML forms emanating from the financial server can contain any combination of the above mentioned new fields in a FORM tag. Furthermore, the present invention can also accommodate a version of HTML that does not incorporate any of the new fields.

Although the present invention has been described with reference to a particular syntax for the new field in the HTML FORM tag, it is not limited to this particular embodiment. Any other syntax can be used provided that it provides a similar function. In addition, the present invention can be achieved using different HTML tags or through the use of new HTML tags.

The general architecture associated with the present invention has now been disclosed. Attention presently turns to a more detailed consideration of the architecture of the invention, the processing performed by the invention, the distinctions between the elements of the architecture, and the advantages associated with the disclosed technology.

Financial Transaction Processing Overview

Figure 9:
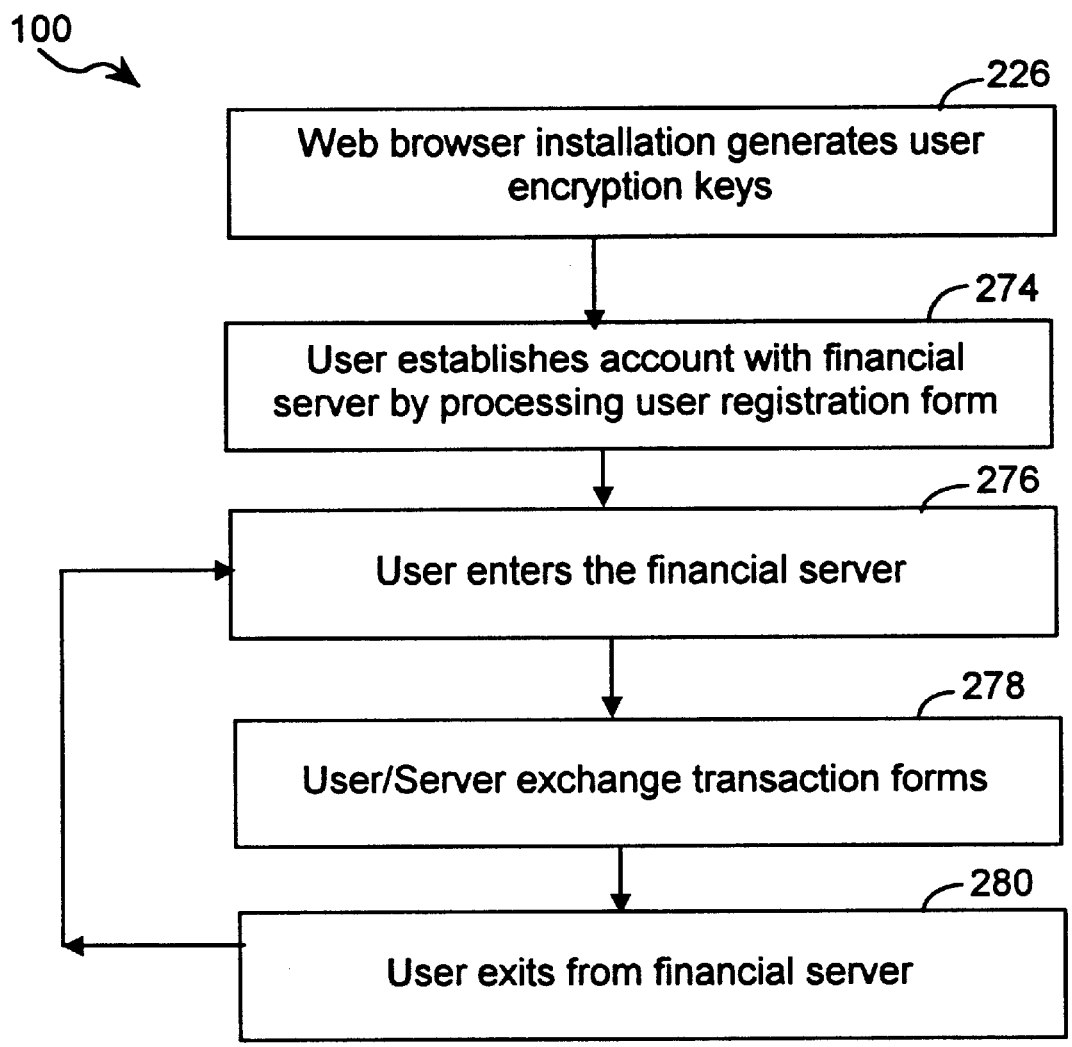
FIG. 9 is a flow chart of the steps used in the financial transaction processing system of the present invention.

FIG. 9 illustrates the steps used in the financial transaction processing system 100 and method of the present invention.

Initially, a user associated with a client computer 106 installs a web browser 216 that generates a pair of encryption keys 218 (step 226). Preferably, a private/public key pair 218 is created where the private key is used by the user to digitally sign forms and the public key is used by the server to authenticate the user's digital signature.

A user establishes an account 134 with the financial server 102. This account 134 is established through a user registration HTML form 264 that is transmitted to the user when the user initially accesses the financial server 102 (step 274). The user registration HTML form 264 elicits general and financial data from the user as well as the user's public key 140.

Once the user has established an account 134 with the financial server 102, the user can logon or access the account 134 at various times (step 276). During each logon session, the user and financial server 102 can exchange HTML transaction forms 124 and forms data 143 (step 278). The format of the forms varies depending on the transaction type. In some cases, the server 102 can transmit to the user an encrypted form. In other cases, the server 102 can request that the web browser 216 return a message in a number of formats. At the completion of a particular session, the user exits (step 280) and can reactivate another session with the financial server 102 at a later time.

Each of the aforementioned processes will now be described below in more detail.

The Web Browser Initialization Procedure

Initially before the financial transaction system 100 is initiated, a user installs a web browser 216 in the client computer 106. As part of the web browser's installation process, an initialization procedure 226 executes which generates one or more encryption keys 218. Preferably, a private and public key pair are generated. The private key is used to create the user's digital signature and the public key is used to verify the user's digital signature.

Figure 10:
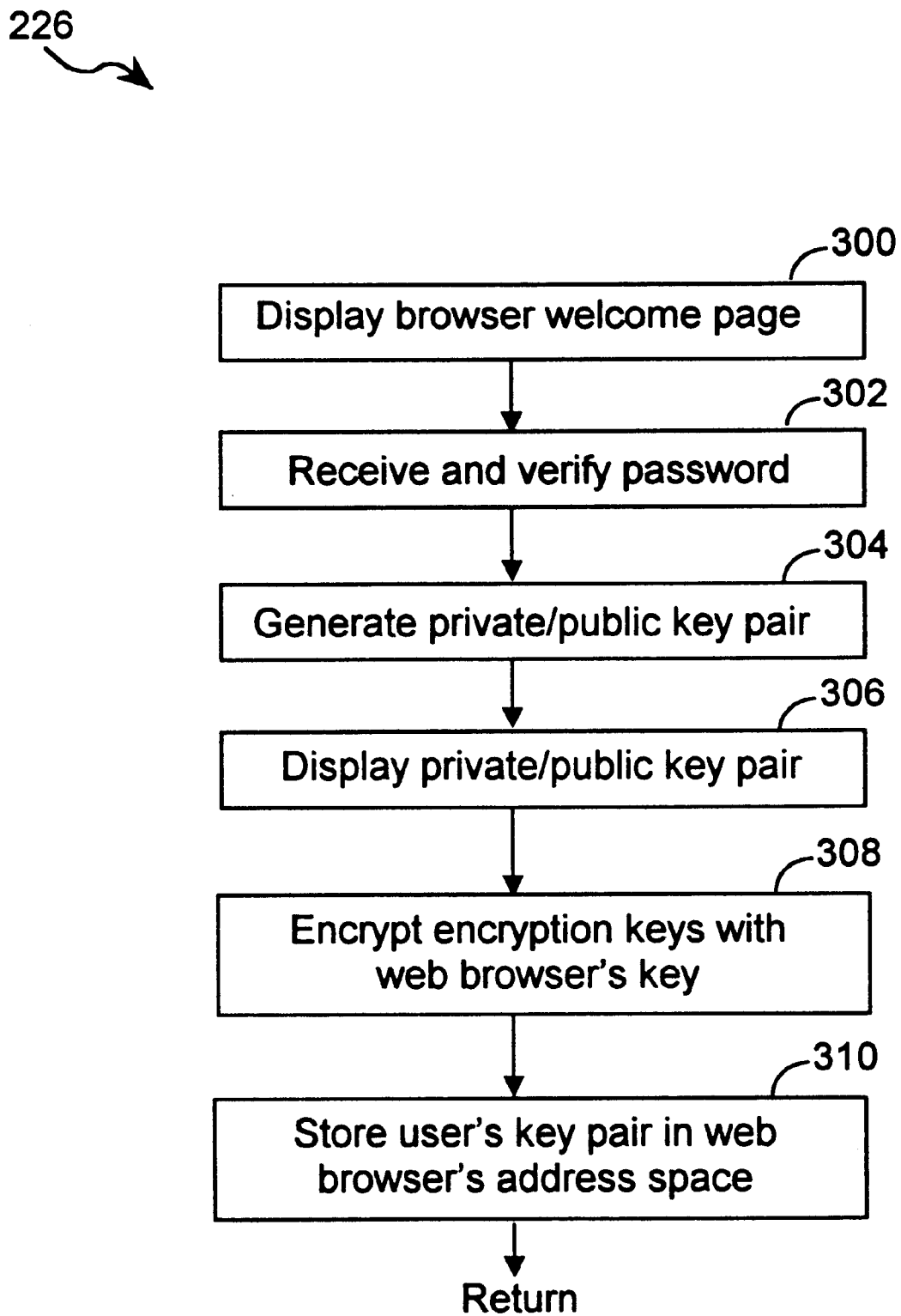
FIG. 10 is a flow chart of the steps used by the web browser to establish encryption keys for a user.

Referring to FIGS. 10 and 11, the initialization procedure 226 displays a browser welcome page 234 (step 300). The initialization procedure 226 prompts the user for the password 232 associated with the browser 216 and verifies it (step 302). Upon successful verification, the user's private/public encryption keys 218 are generated (step 304) and, optionally, displayed to the user (step 306). Any of the well known encryption techniques can be used to generate the encryption keys 218. Encryption techniques are described in Schneier, *Applied Cryptography*, John Wiley & Sons, 2d ed., 1996, which is hereby incorporated by reference as background information.

The initialization procedure 226 then encrypts the user's encryption keys 218 using the browser's encryption key 240 (step 308) to protect those keys from misuse or misappropriation, and stores them in a predefined location within the web browser's address space (step 310).

Financial Server Processing

Figure 12A:
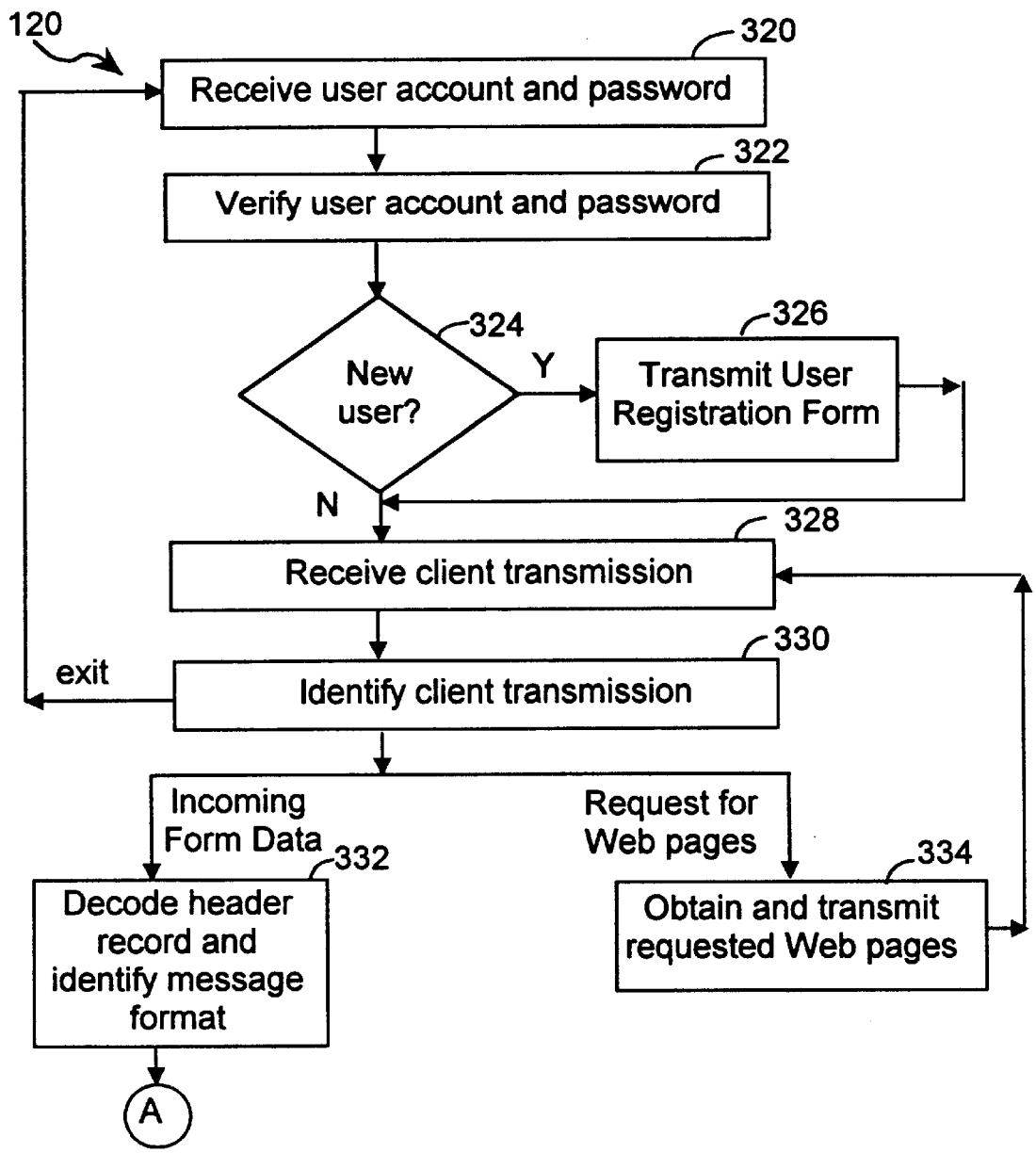
FIGS. 12A–12B are flow charts of the steps used by the financial server in communicating with users associated with client computers.
Figure 12B:
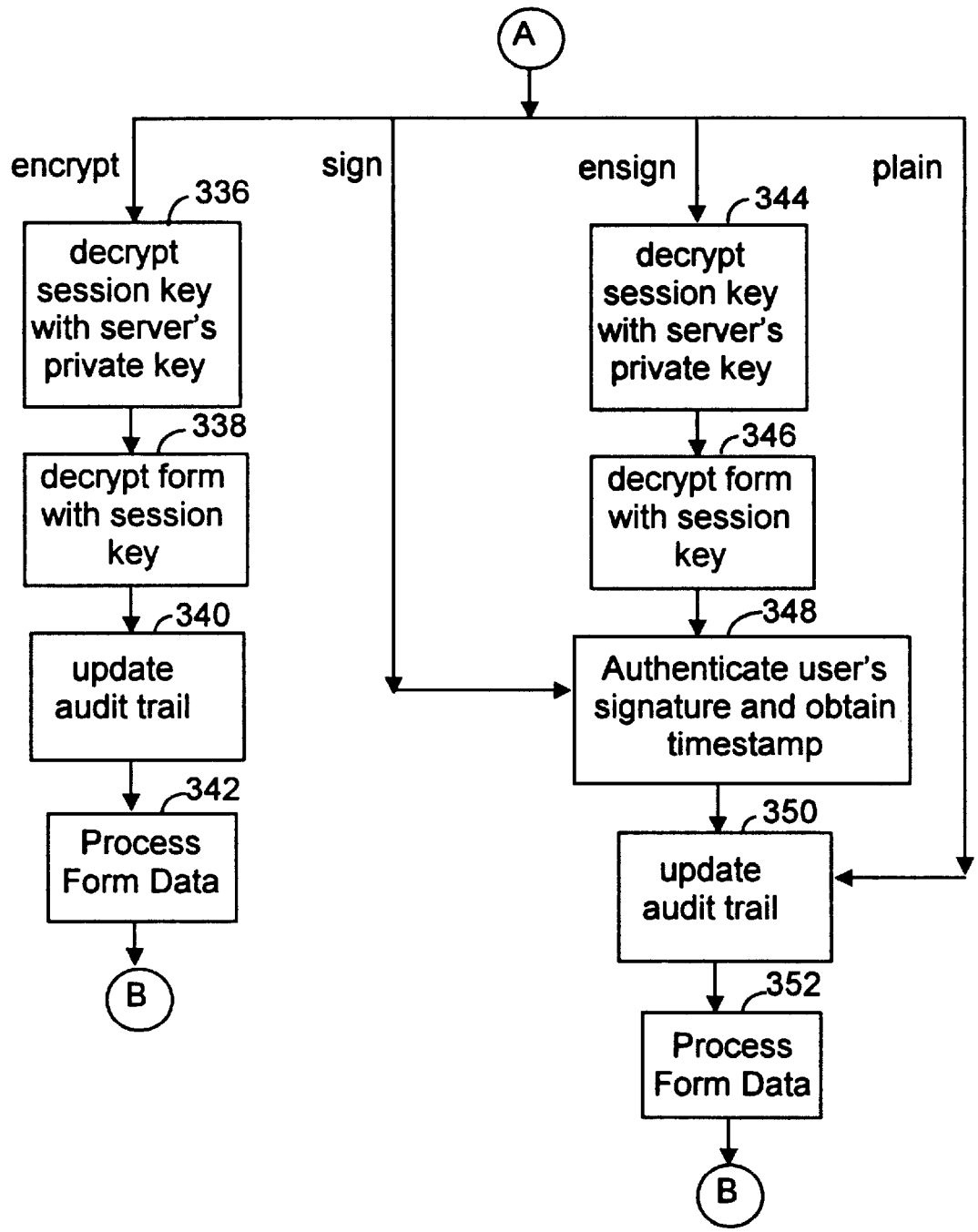

FIGS. 12A–12B illustrate the steps used by the financial server 102 in processing requests and transactions from the users. A user accesses the financial server 102 by means of an account identifier 134 and a password 136 (step 320). The financial server 102 verifies the account 134 and its password 136 (step 322). This verification can be performed by matching the account 134 and password 136 against the data in the user database 132. If the financial server 102 has determined that the user is new (step 324-Y) it transmits a user registration form 264 to the user (step 326). The details of the user registration procedure is described in detail below with reference to FIG. 13.

Otherwise, the user has an established account 134 with the financial server 102 (step 324-N). The financial server 102 awaits for transmissions from the client (step 328). The transmissions can be requests for web pages, form data, as well as other types of communications. The financial server 102 identifies the type of transmission received from the client (step 330) and processes it accordingly.

If the transmission was a request for one or more web pages, the financial server 102 obtains the requested web page and transmits them to the user (step 334). The web pages can contain HTML forms that are encrypted (e.g., documents with confidential information are encrypted). The encrypted forms are identified by special fields in the FORM tag as was described above previously with reference to FIG. 7. Messages with confidential user information sent by a client to the server are preferably encrypted with a session key. Forms sent by the server to a client are preferably encrypted by the server with the client's public key, because any form or document encrypted with the client's public key can be decrypted and viewed only by a person or system having access to the client's private key.

Alternately, forms containing confidential information sent by the server to a client can be encrypted with a session key generated by either the server or client. If the session key is generated by the server, the session key is encrypted with the client's public key, attached to the encrypted form being sent to the client. In this embodiment, the client first decrypts the session key with its private key and then decrypts the form with the session key. Session key encryption is often preferred for encrypting documents (as opposed to short messages) because it is typically performed using encryption techniques (such as DES) that are much less computationally expensive than public/private key encryption.

In yet another alternate embodiment, the server can utilize a different pair of public/private encryption keys for each user. In another alternate embodiment, the server can utilize a different pair of public/private encryption keys for each user for each logon session.

If the transmission is a return message, the flag field 258 of the header record 252 associated with the message is decoded in order to identify the format type (step 332). For an encrypted message (i.e., flag="E"), the server's private key 142 is used to decrypt the encrypted session key 254 (step 336). The session key was encrypted by the user's web browser 216 with the server's public key. The session key 254 is then used to decrypt the enclosed form data 256 (step 338). The server's audit trail 122 is then updated with the user's account and the form data 256 (step 340). The form data 256 is then processed accordingly (step 342).

For an encrypted message that contains the users digital signature and timestamp (i.e., flag="A"), the server's private key 142 is used to decrypt the embedded session key 254 (step 344). The session key 254 is then used to decrypt the enclosed form data 256 (step 346). Next, the user's digital signature 218 is located within the message and verified with the user's public key 140. The timestamp associated with the user's digital signature is also extracted from a predefined location within the message (step 348). The user's public key 140 is obtained from the server's user database 132. The financial server 102 searches the user database 132 using the account ID field 257 of the header record associated with the message. The audit trail 122 is then updated with the user's account, digital signature, timestamp, and the form data (step 350). The form data is then processed accordingly (step 352). The procedure then awaits for a new client communication.

An incoming message 143 that contains the digital signature of the user (i.e., flag="S") is processed using some of the same steps as a message that is encrypted with the user's digital signature and timestamp. The financial server 102 locates the digital signature of the user within the message which is verified with the user's public key 140 (step 348). The audit trail 122 is then updated with the user's account, digital signature, timestamp, and the form data (step 350). The form data is then processed accordingly (step 352). The procedure then awaits for a new client communication.

For messages that are not received in a special format (i.e., messages that are received in a non-encrypted, plain format), the audit trail 122 is updated with the user's account and the form data 256 (step 350). The form data is then processed accordingly (step 352). The procedure then awaits for a new client communication.

Server's User Registration Procedure

Figure 13:
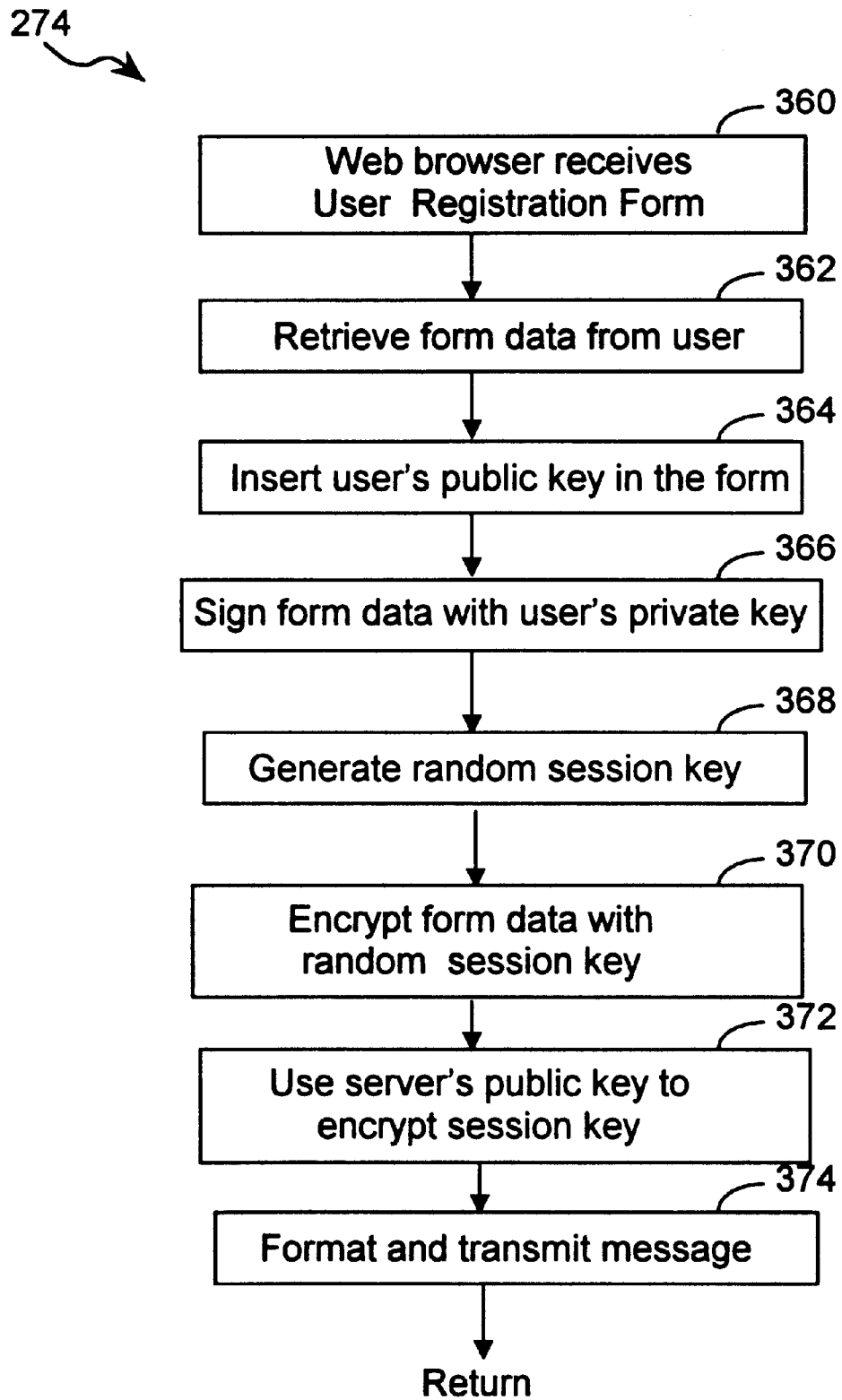
FIG. 13 is a flow chart of the steps used by the web browser in processing a user registration HTML form.

FIG. 13 illustrates the steps used by the web browser 216 in processing a user registration form 264 shown in FIG. 14. The web browser 216 receives an HTML document containing a user registration form 264 from the financial server 102 (step 360).

The user registration form 264 includes data entry fields that the user fills in (step 362). The web browser inserts into the registration form user information (provided by the user of the client computer and/or available to it from other resources in the client computer), typically including data that uniquely identifier the user such as the user's name, social security number or equivalent identifier, and the financial institution account number for an account previously established by the user with the financial institution associated with the server.

The web browser 216, having identified the form as the user registration form from the request field of the FORM tag (i.e., request="register"), obtains the users public encryption key 218 and places it into a predefined location within the return message (step 364). The users public key 218 is stored in an encrypted format in a specified location within the web browser's address space. The user's encryption keys 218 were encrypted with the browser's encryption key 240. Thus, the web browser decrypts the key from the known location with its own encryption key 240.

The web browser 216 then uses the digital signature procedures 230 to digitally sign the form data with the user's private key 218 (step 366). Next, the web browser 216 uses the random session key generation procedures 222 to generate a random session key 254 (step 368). The random session key 254 is used to encrypt the form data (step 370). The session key 254 is affixed to the top of the message and encrypted with the servers public key 142. The servers public key 142 is transmitted through the key field in the FORM tag (i.e., key="server's public key") (step 372). The return message is then formatted using the formatting procedures 224 and transmitted to the server (step 374).

A random session key is a random-bit string generated by means of a random process. Typically, the key bits are generated from a reliably random source or a cryptographically secure pseudo-random bit generator. Any of the well known random sequence generators can be used. A description of these techniques can be found in the Schneier reference previously mentioned with respect to FIGS. 10 and 11.

The server decrypts and verifies the information in the received registration message. If the information satisfies predefined acceptance criteria, such as matching user information associated with a previously established account at the financial institution, then a user information record is added to the user database 132. As shown in FIG. 2, the user information record identifies the user and the user's public key. Alternately (e.g., if the server's database 132 already contains user records for every user having an account at the associated financial institution), a previously existing user information record is updated to include the user's public key.

Web Browser

Once the user is registered with the financial server 102, the user, through the web browser 216, exchanges HTML transaction forms and return messages with the financial server 102. At least some of the HTML documents sent by the server to a client will contain an HTML FORM tag. In accordance with a preferred embodiment, the FORM tag includes special fields that indicate how the associated HTML document is formatted (e.g., whether or not it is encrypted). If the HTML document sent by the server to a client is encrypted, a special "key" field in the FORM tag can be used to specify the server's public key. If the form is of the type that requests user information be returned to the server, the FORM tag also includes special fields that instruct the client's Web browser as to how the return message should be formatted before it is returned to the server. The client's web browser 216 reads these FORM tag fields and performs the appropriate procedures to enable the user to read the HTML document and to properly format the message for transmission back to the server.

Figure 15A:
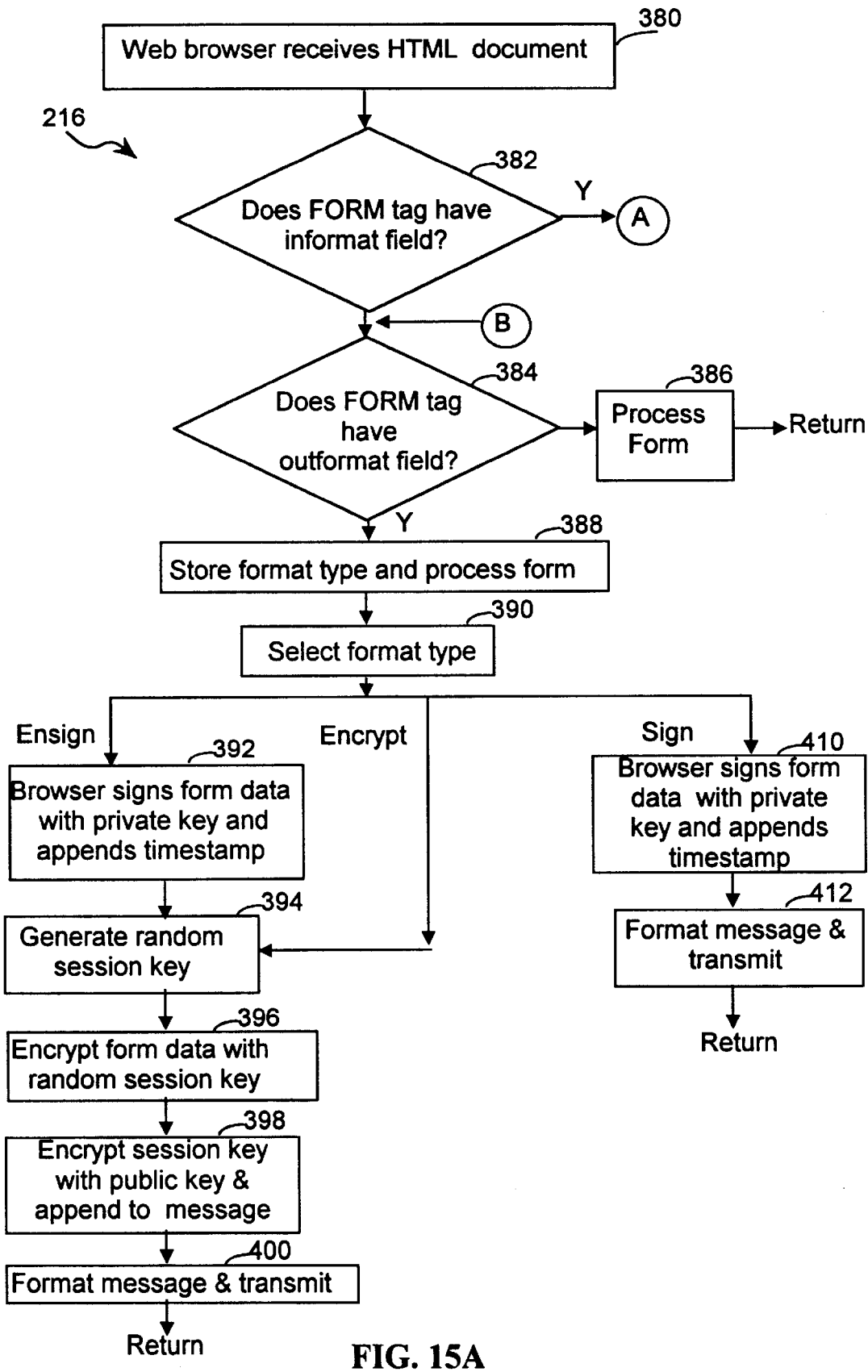
FIGS. 15A–15B are flow charts of the steps used by the web browser in processing HTML documents.
Figure 15B:
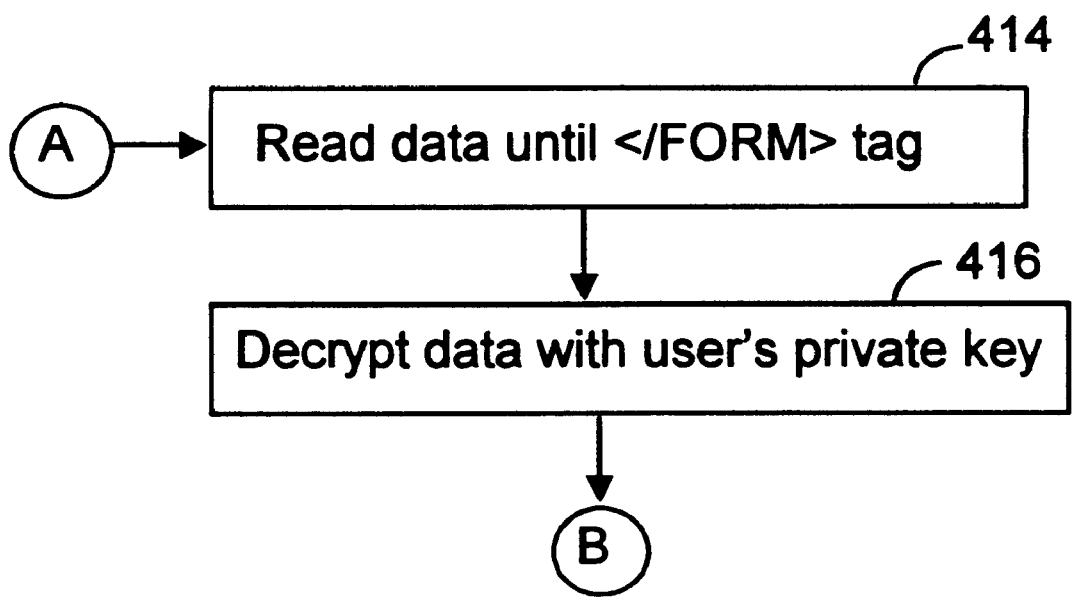

FIGS. 15A–15B illustrate the steps used by the web browser 216 in processing HTML documents that are received from the financial server 102. Upon receipt of an HTML document (step 380), the web browser 216 inspects the fields of the FORM tag. If the FORM tag indicates that the form associated with the tag is encrypted (i.e., the existence of an informat field) (step 382-Y), the web browser 216 recognizes that the data contained between the FORM tag pairs is encrypted. The web browser 216 reads the data from the file until it reaches the corresponding FORM tag pair (i.e., </FORM>) (step 414). The web browser 216 decrypts the form with the user's private key 218 (step 416) and continues to read the tags in the HTML document.

Next, the web browser 216 detects if the FORM tag has an outformat field (step 384). If the FORM tag does not include an outformat field (step 384-N), the form is displayed and processed accordingly (step 386). Otherwise (step 384-Y), the outformat field is stored and the form is displayed and processed accordingly (step 388).

Once the form has been processed, the web browser 216 prepares the return message in accordance with the requested directives specified in the stored outformat field (step 390).

If the requested return message format specified encryption with a digital signature and timestamp (i.e., outformat= "ensign"), the web browser 216 digitally signs the form data with the user's private key 218 and appends a timestamp at a predefined location within the message (step 392). Next, the web browser 216 randomly generates a session key 254 (step 394). The message is then encrypted with the randomly generated session key 254 (step 396). In some embodiments, a single session key is used for all encrypted client message transmissions during a single session, in which case step 396 is skipped after the transmission of the first encrypted client message during a session.

The session key 254 is encrypted with the server's public key 142 and affixed to the encrypted message (step 398). As noted above with respect to FIG. 8, the server's encryption key is transmitted to the web browser either initially with the first transmitted HTML form or with each transmitted HTML form requiring encryption.

A header record 252 is then generated containing a flag 258 having the appropriate value ("A") and the key length 260 of the enclosed session key 254. The message is formatted and then transmitted to the financial server 102 (step 400).

If the requested return message format specified encryption (i.e., outformat="encrypt"), the web browser 216 performs some of the same steps described above. The web browser 216 randomly generates a session key 254 (step 394). The form data is then encrypted with the randomly generated session key 254 (step 396). The session key 254 is affixed to the encrypted form data and encrypted with the server's public key 142 (step 398). A header record 252 is then generated containing a flag 258 having the appropriate value ("E") and the key length 260 of the enclosed session key. The message is formatted and then transmitted to the financial server 102 (step 400).

If the requested return message format specified the user's digital signature (i.e., outformat="sign"), the web browser 216 signs the form data with the user's private key 218 (step 410). In addition, a timestamp is generated and appended to the form data (step 410). A header record 252 is then generated containing the appropriate flag value ("S"). Since no session key is enclosed in the message, the key length field is blank. The message is formatted and then transmitted to the financial server 102 (step 412).

In conclusion, the aforementioned description describes a method and system for securely transmitting transactions embodied as HTML forms between a financial server and a web browser. The technology of the present invention incorporates five security features to ensure that only the intended parties of the transaction securely receive and transmit a transaction. The five security features include: privacy, in the form of session key encryption; data integrity, through the use of data encryption; access control, via a password mechanism; user nonrepudiation, by means of digital signatures and timestamps; and a server side audit trail. These security features are embedded in the financial server and web browser in an automatic and transparent manner.

Alternate Embodiments

While the present invention has been described with reference to a few specific embodiments, the description is illustrative of the invention and is not to be construed as to limiting the invention. Various modifications may occur to those skilled in the art without departing from the true spirit and scope of the invention as defined by the appended claims.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

Although the present invention has been described with reference to encryption and digital signature techniques that utilize encryption key pairs, it is not limited to this particular technique. Any technology or technique that provides similar functionality can be utilized.

Furthermore, one skilled in the art can easily modify the present invention to incorporate a digital signature mechanism in the HTML forms that are transmitted to a web browser. Moreover, additional security features can be easily added to either the client or server side of the transaction processing.

What is claimed:

1. A computer-implemented method for transmitting transactions between at least one client computer and at least one server computer interconnected by a communications link, the method comprising the steps of:

(a) receiving one or more HTML documents at the client computer from the server computer, a subset of the documents including a header record and also including one or more HTML FORM tags, the one or more HTML FORM tags being distinct from the header record, a first subset of the HTML FORM tags having an outformat field indicating a specified outgoing transmission cryptographic protocol;

(b) receiving at the client computer input form data corresponding to the HTML FORM tag;

(c) generating secure form data by applying the specified outgoing transmission security cryptographic protocol of the HTML FORM tag to the input form data; and (d) transmitting a return message including the secure form data to the server computer.

2. The method of claim 1, wherein the specified outgoing transmission cryptographic protocol of the outformat field of the HTML FORM tag is selected from a set consisting of an encrypt protocol, a sign protocol including a digital signature and a timestamp, and an ensign protocol including encryption with a digital signature and a timestamp.

3. The method of claim 1, in accordance with the cryptographic protocol of the HTML FORM tag, said step (c) further including the steps of:

(1) generating a first encryption key;

(2) encrypting the input form data, including any inserted user related information, with the first encryption key;

(3) affixing the first encryption key to the return message; and (4) encrypting the first encryption key with a second encryption key.

4. The method of claim 3, step (c)(1) further including the step of utilizing a random key sequence generator to generate the first encryption key.

5. The method of claim 3, wherein a third subset of the HTML FORM tags includes a key field; and said step (c)(4) further including the step of obtaining the second encryption key from the server computer using the key field.

6. The method of claim 3, said step (c)(1) further including the step of:

prior to the generating step, storing a digital signature associated with a specified user in the return message in accordance with the cryptographic protocol specified in the HTML FORM tag.

7. The method of claim 6, step (c) further including the steps of:

generating a digital signature and a digital signature verifier; and providing the server computer with the digital signature verifier.

8. The method of claim 1, step (c) further including the step of storing a timestamp in the return message, in accordance with the cryptographic protocol specified in the HTML FORM tag.

9. A web browser system for accessing data within a computer system including at least one client computer connected through a communications link with at least one server computer, the web browser system comprising:

a memory for storing a plurality of HTML documents, one or more of the HTML documents including a header record and also having one or more HTML FORM tags, the one or more HTML FORM tags being distinct from the header record, a first subset of the HTML FORM tags having an outformat field indicating a specified outgoing transmission cryptographic protocol for use in returning form data;

a browsing mechanism for retrieving various ones of the HTML documents from the server and for inserting user related information in the form data which is included in a return message, the browsing mechanism including a cryptographic processing mechanism for generating secure form data by applying the specified outgoing transmission cryptographic protocol from the HTML FORM tag to the form data, the browsing mechanism for transmitting a return message including the secure form data from the client computer to the server computer to provide secure transmission of the return message transmitted to the server computer.

10. The web browser system of claim 9, wherein the cryptographic processing mechanism includes an encryption processing mechanism for encrypting the return message and decrypting HTML documents in accordance with the specified cryptographic protocol format of the HTML FORM tag.

11. The web browser system of claim 9, wherein the cryptographic processing mechanism includes a digital signature processing mechanism for signing the return message and authenticating HTML documents when the specified outgoing transmission cryptographic protocol is a sign format.

12. The web browser system of claim 11, wherein the digital signature processing mechanism includes a timestamp processing mechanism responsive to the cryptographic protocol of the HTML FORM tag.

13. The web browser system of claim 9, wherein the cryptographic processing mechanism includes an encryption key generation mechanism for creating one or more encryption keys.

14. The web browser system of claim 13, wherein the encryption key generation mechanism includes a random key generation mechanism for creating one or more random session keys.

15. A computer program product for secure data transmission between a server computer and a client computer, the computer program product for use in conjunction with a computer system, the computer program product comprising a computer readable storage medium and a computer program mechanism embedded therein, the computer program mechanism comprising:

a web browser that receives one or more HTML documents from the server computer, a subset of the HTML documents including a header record and also including one or more HTML FORM tags, the one or more HTML FORM tags being distinct from the header record, a first subset of the HTML FORM tags having an outformat field indicating a specified outgoing transmission cryptographic protocol, the web browser including a cryptographic processing mechanism for generating secure form data by applying the specified outgoing transmission security format from the HTML FORM tag to the form data, the web browser transmitting a return message including the secure form data from the client computer to the server computer.

16. The computer program product of claim 15, wherein the cryptographic processing mechanism includes an encryption processing mechanism for decrypting HTML documents and encrypting the return message in accordance with the specified cryptographic protocol of the HTML FORM tag.

17. The computer program product of claim 15, the cryptographic processing mechanism includes a digital signature processing mechanism for signing the return message and authenticating the HTML documents in accordance with the specified outgoing transmission cryptographic protocol of the HTML FORM tag.

18. The computer program product of claim 17, wherein the digital signature processing mechanism includes a timestamp processing mechanism for use in conjunction with the specified outgoing transmission cryptographic protocol of the HTML FORM tag.

19. The computer program product of claim 15, wherein the cryptographic processing mechanism including an encryption key generation mechanism for creating one or more encryption keys.

20. The computer program product of claim 19, wherein the encryption key generation mechanism including a random key generation mechanism for creating one or more random session keys.

21. A computer network for financial transaction processing, the network comprising:

a plurality of client computers, each client computer associated with one or more users;

at least one financial server comprising:

a memory for storing a plurality of HTML documents representing financial transactions, each HTML document including form data, a subset of the HTML documents including a header record and also including one or more HTML FORM tags, the one or more HTML FORM tags being distinct from the header record, a first subset of the HTML FORM tags having an outformat field indicating a specified outgoing transmission cryptographic protocol, for use in exchanging financial transactions between the client computers and the server computer;

one or more cryptographic processing mechanisms for use in encoding form data and decoding each received HTML document; and a server mechanism for managing communications from the client computers, a subset of the communications including a return message including the form data, the server mechanism including instructions to interpret the HTML FORM tags that include the cryptographic protocol associated with each received return message and to process each received return message in accordance with one or more corresponding cryptographic protocol mechanisms.

22. The network of claim 21, the cryptographic processing mechanism including:

an encryption processing mechanism for encrypting the form data and decrypting the HTML documents;

a user information database that includes user public key information associated with each user registered to exchange confidential information with the financial server;

a digital signature verification mechanism for verifying a digital signature in each digitally signed communication received from a client computer in accordance with the corresponding digital signature, if any, stored in the user information database; and an audit trail for storing records of digitally signed communications received from client computers sufficient to prove that such each received communication was digitally signed by a respective user registered to exchange confidential information with the financial server.

23. The network of claim 22, the cryptographic protocol selected from the set consisting of encryption, digital signature and timestamp, and encryption with digital signature and timestamp.

24. The network of claim 22, each client computer including a web browser for accessing HTML documents from the financial server.

25. The network of claim 24, the web browser including a cryptographic processing mechanism for encrypting form data and decrypting the accessed HTML documents in accordance with the specified cryptographic protocol format of the HTML FORM tag.

26. The network of claim 24, the web browser including a digital signature processing mechanism for signing the return message and authenticating HTML documents when the specified outgoing transmission cryptographic protocol is a sign format.

27. The network of claim 26, the digital signature processing mechanism further including a timestamp processing mechanism responsive to the cryptographic protocol of the HTML FORM tag.

28. The network of claim 24, the web browser including an encryption key generation mechanism for creating one or more encryption keys.

29. The method of claim 1 wherein a third subset of the HTML FORM tags have a request field indicating the type of form.

30. The method of claim 29 wherein the request field indicates that a registration HTML form is being sent to the client, the registration form for transmitting a client public key from the client to the server.

31. The method of claim 1 wherein a fourth subset of the HTML FORM tags have a key field that is used to indicate a public key associated with the server.

* * * * *